US008803687B2

(12) United States Patent
Valiulis et al.

(10) Patent No.: US 8,803,687 B2
(45) Date of Patent: Aug. 12, 2014

(54) RETAIL SYSTEM SIGNAL RECEIVER UNIT FOR RECOGNIZING A PRESET AUDIBLE ALARM TONE

(75) Inventors: Thomas E. Valiulis, Rockford, IL (US); Peter T. Valiulis, Rockford, IL (US)

(73) Assignee: Southern Imperial, Inc., Rockford, IL (US)

( * ) Notice: Subject to any disclaimer, the term of this patent is extended or adjusted under 35 U.S.C. 154(b) by 287 days.

(21) Appl. No.: 13/312,644

(22) Filed: Dec. 6, 2011

(65) Prior Publication Data
US 2013/0142494 A1 Jun. 6, 2013

(51) Int. Cl.
*G08B 21/00* (2006.01)
(52) U.S. Cl.
USPC ............... 340/571; 340/568.1; 340/568.2; 340/568.7; 386/225
(58) Field of Classification Search
USPC ..................................... 340/571; 386/225
See application file for complete search history.

(56) References Cited

U.S. PATENT DOCUMENTS

| 6,690,411 B2* | 2/2004 | Naidoo et al. ............. 348/143 |
| 2002/0067259 A1* | 6/2002 | Fufidio et al. ............. 340/541 |
| 2003/0175004 A1 | 9/2003 | Garito et al. |
| 2003/0227382 A1* | 12/2003 | Breed ..................... 340/539.13 |
| 2006/0198611 A1* | 9/2006 | Park ......................... 386/107 |
| 2009/0109027 A1 | 4/2009 | Schuller |
| 2010/0175438 A1 | 7/2010 | Sankey |
| 2011/0215060 A1 | 9/2011 | Niederhuefner |
| 2011/0227735 A1 | 9/2011 | Fawcett et al. |

FOREIGN PATENT DOCUMENTS

| KR | 100823026 B1 | 4/2008 |
| KR | 20100137956 A | 12/2010 |
| KR | 2020110002261 U | 3/2011 |
| KR | 20110043837 A | 4/2011 |
| KR | 20110080411 A | 7/2011 |
| WO | WO 01/81988 A2 | 11/2001 |
| WO | WO 2011/025085 A1 | 3/2011 |

OTHER PUBLICATIONS

U.S. Appl. No. 13/312,699, filed Dec. 6, 2011, Valiulis et al.
Indyme smartresponse; 2 pages printed from internet http://www.indyme.com/; date last visited Apr. 8, 2013.

* cited by examiner

*Primary Examiner* — Nabil Syed
*Assistant Examiner* — Mark Rushing
(74) *Attorney, Agent, or Firm* — Reinhart Boerner Van Deuren P.C.

(57) ABSTRACT

A signal receiver unit for retail systems is provided. The signal receiver unit may include a receiver, a processor, and an output transmitter, and may be configured to receive and process an alarm signal and to transmit an output signal in response. The output signal may be configured to be received by an output receiving device such that store personnel may be alerted to a possible theft.

6 Claims, 4 Drawing Sheets

RETAIL SYSTEM SIGNAL RECEIVER UNIT FOR RECOGNIZING A PRESET AUDIBLE ALARM TONE

FIELD OF THE INVENTION

This invention generally relates to devices and systems for tracking retail activity, and more particularly to a receiver unit for anti-theft systems operable to indicate when an item of merchandise has been removed from a retail display.

BACKGROUND OF THE INVENTION

Loss prevention is a continuing problem in the retail industry. Current anti-theft systems involve locking up merchandise behind counters, far away from related merchandise, or locking up the merchandise in secure cabinets, closer to the place where related merchandise is generally stored.

There are disadvantages to each of these methods. When merchandise is stored in a secured location away from the point of storage of related items, sales of the secured merchandise decrease because customers are less likely to go out of their way to locate a sales associate to retrieve the merchandise. Also, sales of related items that would otherwise be situated in proximity to the secured merchandise decrease as well because the customer is not drawn to their location.

Therefore, although common anti-theft systems may be effective at preventing loss, they also have the significantly negative impact of reducing sales.

Accordingly, there exists a need in the art for an anti-theft system for retail stores that will deter theft without discouraging the sale of the merchandise and related items. Additionally, the anti-theft system should be able to be retrofitted onto existing retail displays to keep the cost of installation and the shelving downtime required for installation as low as possible.

The invention provides such an anti-theft system. This and other advantages of the invention, as well as additional inventive features, will be apparent from the description of the invention provided herein.

BRIEF SUMMARY OF THE INVENTION

In one aspect, an audible anti-theft alarm receiver unit is provided. An embodiment according to this aspect includes a receiver, a processor, and an output transmitter. The receiver is adapted to receive the ambient noise of a retail environment. The processor is electrically connected to the receiver, and is adapted to recognize a preset audible alarm tone. The processor is further adapted to generate an output signal upon the occurrence of a preset condition of the preset audible alarm. The output transmitter is also electrically connected to the processor, and is adapted to transmit the output signal to an output device. In one embodiment, the audible anti-theft alarm receiver unit is configured to alert store personnel to potential thefts in response to the audible alarms triggered on individual retail display structures.

In one embodiment, the output device is a computer. In another embodiment the output device is a cellular telephone. The output signal generated by the audible anti-theft alarm receiver unit is configured to be received by the computer or the cellular telephone as a textual message such as an e-mail message or a text message.

In another embodiment, the output device is a public address system. The output signal is configured to be received by the public address system. The public address system, upon receipt of the output signal, plays a pre-recorded message that would alert store employees to a possible theft.

In another embodiment, the output device is a camera. The output signal is configured to initiate the recording of video footage or the taking of still photographs.

In another embodiment, the output transmitter is a wireless antenna. In another embodiment, the audible anti-theft alarm receiver unit also includes a memory storage unit. The memory storage unit is electrically connected to the processor. Information regarding preset audible alarm tones recognized by the processor may be stored in the memory unit.

In another embodiment, the processor is configured to access the memory storage unit and compile a report of data collected over a period of time.

Various further embodiments provide various preset conditions of the audible alarm. In one embodiment, the preset condition of the audible alarm is a decibel level. In another embodiment, the preset condition is a frequency of occurrence. In yet another embodiment, the preset condition is a pitch.

In another embodiment, the output device is a second audible anti-theft receiver unit. The output signal is adapted to be received by the second audible anti-theft receiver unit for the purpose of activating a local indicating device proximate the second audible anti-theft receiver unit.

In another aspect, the invention provides a method for receiving and processing audible alarms with an audible anti-theft alarm receiver unit. An embodiment according to this aspect includes the steps of monitoring the ambient noise of a retail environment, recognizing a preset audible alarm within the ambient noise, and transmitting an output signal in response to the recognition of the preset audible alarm.

Various further embodiments provide various ways to perform the step of transmitting an output signal. In one embodiment, the step of transmitting an output signal includes commanding a public address system to play a pre-recorded announcement. In another embodiment, the step of transmitting an output signal includes transmitting a textual message to an output receiving device. In another embodiment, the step of transmitting an output signal includes commanding a camera to begin recording video footage or taking still photos.

In one embodiment, a signal receiver unit for retail systems is provided. The signal receiver unit includes a controller including a receiver and a control circuit. The receiver is configured to receive a first signal from a retail display device including an emitter. The first signal is indicative of a merchandise dispensing event at the retail display device. The receiver is also configured to receive a second signal from the retail display device including the emitter. The second signal is indicative of a potential theft condition. The control circuit is determine whether a received signal is a first signal or a second signal and to produce an output indicative of a merchandise dispensing event if a received signal is a first signal and to produce an output indicative of a potential theft condition if a received signal is a second signal.

In one embodiment, the control unit further includes an output transmitter. The control circuit comprises a microprocessor. The microprocessor is configured based on programmed logic to generate an output indicative of a signal received. The control circuit is also configured to transmit the output via the output transmitter to at least one of a pager system, a text system, a memory, a computer, a public address system, a telephone, a cellular telephone, a camera, a video camera, and an alarm.

In one embodiment the first and second signals each include at least one of an audible sound, infrared light, visible light, radio waves, and microwaves.

In one embodiment, the first and second signals each include audible sound waves. The first and second signals each have at least one of unique frequencies, wavelengths, frequencies of occurrence, pitches, and volumes. The control circuit is configured to identify each of the first and second signals based on the at least one of the unique frequencies, wavelengths, frequencies of occurrence, pitches, and volumes.

In one embodiment, the controller is configured to receive and identify the source of a plurality of unique first and second signals from a plurality of retail display devices.

In one embodiment, the controller is configured to output a report including at least one of an amount of first signals received, a frequency of first signals received, times at which first signals have been received, an amount of second signals received, a frequency of second signals received, and times at which second signals have been received. The report is configured to be received and read by an external software program.

In one embodiment, a theft deterrent system is provided. The theft deterrent system includes a sensor operatively associated with an emitter. The sensor is configured to sense a potential theft condition at a retail display unit. The emitter is configured to emit an alarm signal when a potential theft condition is sensed by the sensor. A signal receiver unit is also provided. The signal receiver unit includes a receiver in operative communication with a control circuit. The signal receiver unit also includes an output transmitter. The output transmitter is in operative communication with a control circuit. The receiver unit is configured to receive an alarm signal. The control circuit is configured to recognize an alarm signal received by the receiver. The control circuit is configured to output a signal indicating that the emitter has emitted an alarm signal indicating that a potential theft condition has occurred at the retail display unit via output transmitter to an output device.

In one embodiment the theft deterrent system includes a plurality of emitters. The emitters are each operatively associated with one of a plurality of sensors. Each of the emitters is configured to emit an alarm signal having a unique identifier. The control circuit is configured to identify the source of alarm signals received by the receiver.

In one embodiment, the emitters are configured to emit alarm signals comprising audible sound waves. The control circuit is configured to identify the one of the emitters that emitted each alarm signal by at least one of the volume, frequency, pitch, and wavelength of the audible sound waves.

In one embodiment, an alarm signal emitted by the emitter travels wirelessly to the receiver. An alarm signal emitted by the emitter includes at least one of audible sound waves, infrared light, visible light, radio waves, and microwaves.

In one embodiment, the sensors are configured to sense at least one of when a retail display device has been actuated to allow removal of merchandise from the retail display device and when merchandise has been removed from a retail device. Each of the emitters are configured to emit a removal signal when its associated sensor senses at least one of when its associated retail display device has been actuated to allow removal of merchandise from the retail display device and when merchandise has been removed from the retail display device. The receiver is configured to receive removal signals. The control circuit is configured to recognize removal signals and produce an output indicative of a received removal signal upon recognition of the removal signal.

In one embodiment, the signal receiver unit includes a memory. Upon recognition of alarm and removal signals by the control circuit, at least one of the type of signal received, the time of reception, and the emitter from which the signal is received is stored in the memory. The signal receiving unit is configured to selectively output the contents of the memory.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of the present invention provide a signal receiver unit, shown in the illustrated embodiment as an audible anti-theft alarm receiver unit that, when used in various arrangements of a theft deterrent system, shown in the illustrated embodiment as an audible anti-theft system, may deter theft without discouraging the sale of merchandise.

Figure 1:
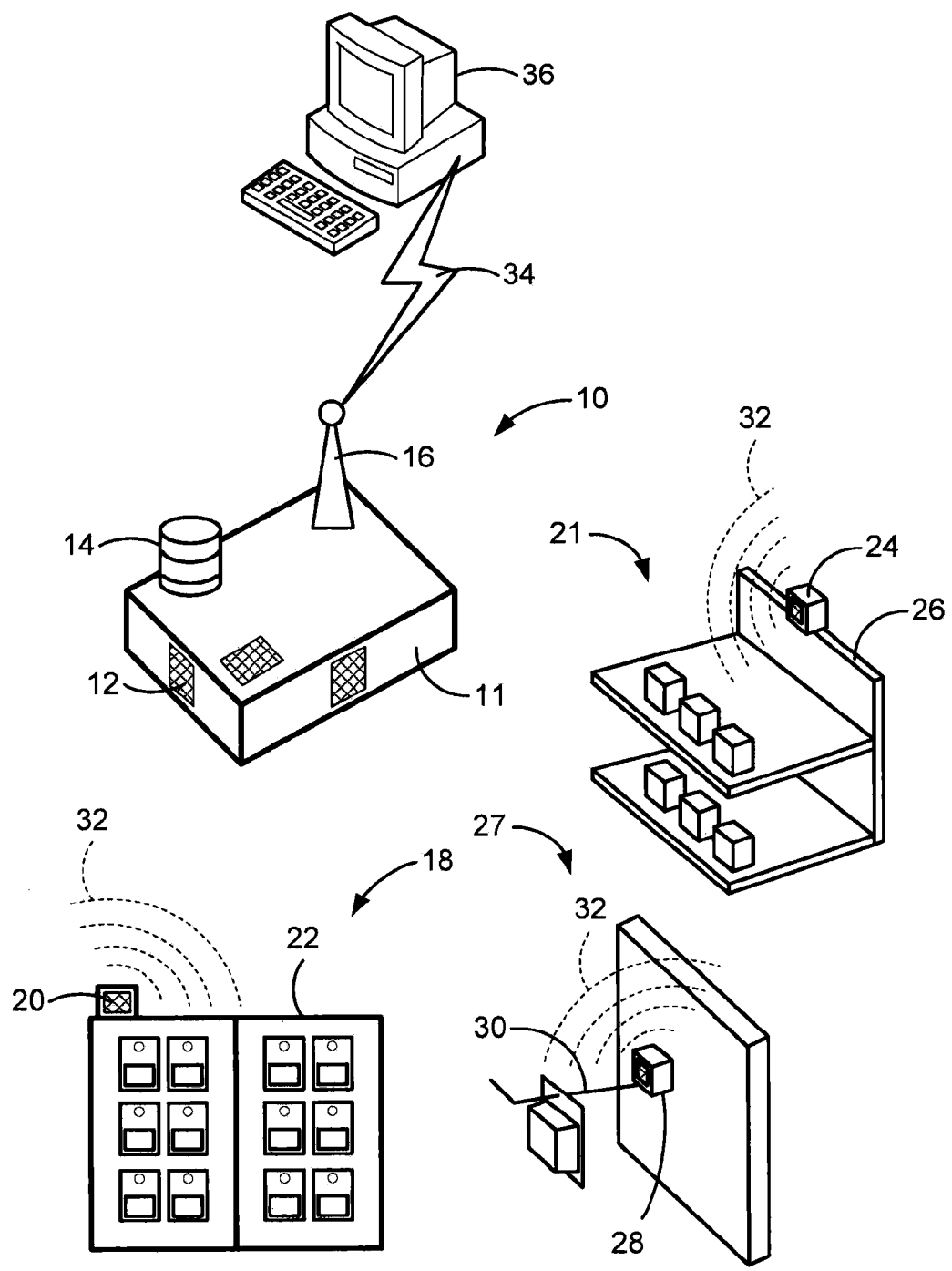
FIG. 1 is a perspective view of a first embodiment of a retail system signal receiver unit, such as an audible anti-theft alarm receiver unit, according to the teachings of the present invention, arranged as a component in a theft deterrent system, such as an audible anti-theft system.

FIG. 1 depicts an embodiment of a signal receiver unit, in the illustrated embodiment an retail system signal receiver unit 10 in a first arrangement of a theft deterrent system, in the illustrated embodiment an audible anti-theft system. FIG. 1 further illustrates the retail system signal receiver unit 10 relative to other components of the audible anti-theft alarm system, including retail display devices 18, 21, and 27 including signal emitting retail devices 20, 24, and 28 including sensors and emitters, and an output receiving device such as the computer 36. Though the sensors and emitters are illustrated as contained within signal emitting retail devices 20, 24, 28, it is envisioned that the sensors and emitters may be separate devices in operative communication in manner known in the art and each located in various suitable locations within, on, or around the retail display devices 18, 21, 27 as would be understood by one having ordinary skill in the art.

It will be understood that the retail system receiver unit 10 can be used in many different retail system and anti-theft system arrangements, and the quantity and type of other components, such as retail display devices 18, 21, and 27 and signal emitting retail devices 20, 24, 28 shown are for illustrative purposes only. As will be discussed further below, the signal emitting retail devices 20, 24, and 28 may be audible alarm sounding devices or may be various other suitable types of signal emitting retail devices. In some embodiments the retail system signal receiver unit 10 may be a audible anti-theft alarm receiver unit or may be a receiver unit for any other suitable type of signal, as described further below.

The retail system signal receiver unit 10 is adapted to receive and process a signal 32, in one embodiment a preselected audible alarm, emitted by the signal emitting retail devices 20, 24, 28. The signal emitting retail devices 20, 24, 28 are configured to emit the signal 32 when a potential theft condition occurs. The retail system signal receiver unit 10 in one embodiment includes a control circuit, such as in one example a microprocessor that is configured to process the signal 32 and to transmit an output signal 34 to a computer 36. The output signal 34 may be transmitted over a wired connection or wirelessly by any suitable means known in the art. This enables the unit 10 to transmit messages to key store personnel about a possible theft. It is also contemplated that the output signal 34 may be transmitted to PDA's, smart phones, cameras, walkie-talkies, PA systems, and other suitable receiving devices.

The signal emitting retail devices 20, 24, and 28 may be mounted to or otherwise used in conjunction with various retail display devices such as the retail display devices 18, 21, and 27 to accommodate the various display needs of retail environments. In a first embodiment, the retail display device 18 includes a sensor and an emitter, illustrated together as contained within a single signal emitting retail device 20, and also includes a cabinet 22.

The cabinet 22 includes a door, such as a transparent sliding door, hinged door, or any other suitable configuration. In order to remove merchandise, a customer must open the door. The sensor of the signal emitting retail device 20 may be configured to sense when the door is opened or when a piece of merchandise is removed from the cabinet. The sensor may be a motion sensor, inductive sensor, capacitive sensor, optical sensor, piezo electric sensor, or any other type of sensor known in the art for determining when the door is opened or when a piece of merchandise is removed from the cabinet 22.

In one embodiment, the emitter of the signal emitting retail device 20 is in operative communication with the sensor and when the sensor detects that the door of the cabinet 22 has been opened or that a piece of merchandise has been removed from the cabinet 22, the emitter will send out a first signal indicative of the fact that the door of the cabinet 22 has been opened or that a piece of merchandise has been removed from the cabinet 22. Additionally, the signal emitting retail device 20 may include a timer. When the sensor senses that the door of the cabinet 22 has been opened, the timer of the signal emitting retail device 20 may be started and when the sensor senses that the door of the cabinet 22 has been closed, the timer may be stopped and reset. If more than an adjustable, preset period of time elapses between when the door is opened and closed, and thus, when the timer is started and stopped, the signal emitting retail device 20 is configured to emit a second signal indicative of the fact that the door has been opened for more than the preset period of time, which may be indicative of a potential theft condition.

In another embodiment, the sensor of the signal emitting retail device 20 may sense when a piece of merchandise is removed from the cabinet 22. The signal emitting retail device 20 may also include a control circuit, such as, in one embodiment, a microprocessor, and a memory. The control circuit may access the memory to keep track of, for example, the number of times that the door of the cabinet 22 has been opened in a given time period or the number of pieces of merchandise that have been removed from the cabinet 22 in a given time period. If one of these amounts exceeds an adjustable, preset limit, the signal emitting retail device 20 may determine that a potential theft condition exists and is configured to emit a signal indicative of the potential threat condition.

In one embodiment another retail display device 21 is provided. The retail display device 21 includes a shelving unit 26 upon which merchandise may be displayed. The retail display device 21 also includes a sensor and an emitter, illustrated together as contained within a single signal emitting retail device 24 mounted to the shelving unit 26. It is envisioned that the sensor and emitter of the retail display device 24 may also be housed separately and may be arranged and configured in any suitable configuration. The signal emitting retail device 24 may be located in various suitable locations relative to the shelving unit 26. The sensor of the signal emitting retail device 24 is configured to sense when merchandise is removed from the shelving unit 26. The signal emitting retail device 24 is configured to emit a first signal, indicating that merchandise has been removed from the shelving unit 26, when the sensor determines that merchandise has been removed from the shelving unit 26. The sensor is further configured to determine when a potential theft condition exists, e.g., more than a preset amount of merchandise has been removed in a given period of time, more than a preset number of pieces of merchandise have been removed at once, etc., and to emit a second signal indicating the potential theft condition.

In one embodiment, another retail display device 27 is provided. The retail display device 27 includes a hook 30 upon which merchandise may be hung and displayed. The retail display device 27 also includes a sensor and an emitter, illustrated together as contained within a single signal emitting retail device 28 mounted proximate the hook 30. It is envisioned that the sensor and emitter of the retail display device 27 may also be housed separately and may be arranged and configured in any suitable configuration.

In one embodiment, the sensor of the signal emitting retail device 28 is configured to sense when merchandise is removed from the hook 30. The signal emitting retail device 28 is configured to emit a first signal, indicating that merchandise has been removed from the hook 30 when the sensor determines that merchandise has been removed from the hook 30. The sensor is further configured to determine when a potential theft condition exists, e.g., more than a preset amount of merchandise has been removed in a given period of time, more than a preset number of pieces of merchandise have been removed at once, etc., and to emit a second signal indicating the potential theft condition.

U.S. patent application Ser. No. 13/312,699, filed on Dec. 6, 2011, entitled Signal Emitting Retail Device, discloses various embodiments of devices that may be used as signal emitting retail devices in conjunction with embodiments of the signal receiver unit 10 disclosed herein and is incorporated herein by reference in its entirety.

Additionally, it is envisioned that any suitable number of signal emitting retail devices associated with any suitable number of retail display devices may be used with the signal receiver unit 10. Additionally, in one embodiment, there may be several receiver units provided, each configured to receive signals from one or many signal emitting retail devices.

In one embodiment, the signals emitted by the signal emitting retail devices may be any suitable signal type known in the art, including sound, infrared light, visible light, radio frequency, microwave, combinations thereof, etc. Each of the signal emitting retail devices may use the same or different types of signals. Additionally, regardless of the type of signal used, the signals may have various identifying characteristics that may be identified by the signal receiver unit. Moreover, each signals may include information or distinguishing characteristics regarding the specific signal emitting retail device from which the signal was emitted. Additionally, each signal may include information or distinguishing characteristics indicative of the signal's purpose, e.g., to indicate a piece of merchandise has been removed, to indicate a potential theft condition, etc.

Based on the type of signals used, suitable types of emitters for emitting these signals and suitable types of signal receiver unit receivers and processors are envisioned.

For example, in one embodiment, the signals emitted by the signal emitting retail devices are sound signals. The emitters of the signal emitting retail devices are sound emitters, such as, for example, speakers, and are configured to emit sounds that the signal receiver unit will receive and recognize. The sounds emitted will have a characteristic that is unique to the signal emitting retail device from which the sound was emitted and that is recognizable by the signal receiver unit. Such characteristics, for example, may include wavelength or frequency of the sound, frequency with which a particular emitter emits sounds, pitch, volume at which the sound is emitted or received, etc. Other characteristics are also envisioned. Additionally, the sounds emitted may include characteristics that are indicative of the event the sounds are intended to indicate, e.g., removal of merchandise, potential theft condition, etc. For example, a first signal indicating removal of a piece of merchandise may be sound at a first pitch and volume emitted by a signal emitting retail device and a second signal indicating a potential theft condition may be sound at a second pitch and volume emitted by a signal emitting retail device. Additionally, many other variations to identify signals are also envisioned.

In another embodiment, the signals emitted by the signal emitting retail devices may include encoded messages using any suitable protocol. Information regarding signal emitting retail source device, type of signal, additional information, error information, etc. may be included in the encoded messages. Additionally, many other suitable types of information to be encoded and transmitted by the signal emitting retail devices is also envisioned.

With further reference to FIG. 1, the structural elements of an embodiment of the receiver unit 10 are discussed. The receiver unit 10 includes a receiver 12 located on a first face of the main body 11; however, one or more receivers 12 may be installed in any acceptable location proximate the main body 11. The receiver 12 may be any suitable type of receiver, e.g., sound receiver, antenna, etc., for receiving signals transmitted by signal transmitting retail devices. Additionally, it is envisioned that that the receiver unit 10 may include multiple receivers each configured to receive different types of signals.

In one embodiment, the receiver unit 10 also includes an output transmitter such as an antenna 16, although other types of output transmitters such as a wired electrical connection may be used. In one embodiment, the receiver unit 10 may also include a local indicating device such as a light 14 or any other suitable type of indicating device. The light 14 may be used as a local indicator that lights up when the receiver unit 10 receives a signal from a signal transmitting retail device indicating a potential theft condition. As such, it is envisioned that the receiver unit 10 may alert store personnel to a possible theft in one or more ways, including a local indication that personnel near the receiver unit 10 may see or hear, and a remote indication that is directed to an output device.

In one embodiment, the receiver unit 10 may be configured to monitor for, recognize, and respond to various signals 32. In one embodiment, for example, when signals transmitted by signal transmitting retail devices include audible signals, the receiver unit 10 may receive and distinguish signals having a variety of pitches, decibel levels, wavelengths, frequencies, and frequencies of occurrence. As such, the receiver unit 10 has the ability to distinguish between a first signal type indicating a normal condition, such as a customer selecting and or removing one of the monitored merchandise and a potential theft condition.

In one embodiment, the receiver unit 10 is configured to transmit an output signal when it has recognized a preset number of signals 32 indicating removal of units of merchandise during a preset period of time, i.e., a preset frequency of occurrence. Such a period of time or frequency of occurrence may be adjustable. Thus, if items of merchandise are being removed from their displays with a regular frequency of occurrence that indicates normal purchasing activity, the receiver unit 10 may be configured not to transmit an output signal 34. However, if items of merchandise are removed rapidly in a manner that indicates a possible theft condition, for example, the receiver unit 10 will generate an output signal 34 and/or activate the light 14 to alert store personnel.

In one embodiment in which the signals generated by signal transmitting retail devices include audible signals, e.g., audible alarm signals, the receiver unit 10 is adapted to transmit an output signal 34 in response to receiving the audible signal from a signal transmitting retail device at or exceeding a preset decibel level. This preset decibel level may be adjustable. In this embodiment, the signal transmitting retail device 20, 24, or 28 is configured to transmit a softer, lower decibel warning beep if a retail display such as a door of a cabinet 22 is left in an open position for longer than a preset time period, and to increase the volume and decibel level of the warning beep as the amount of time that the retail display remains in the open position increases. The receiver unit 10 is configured to transmit an output signal 34 and/or activate the light 14 when the alarm tone received by the receiver unit 10 reaches or exceeds a certain decibel level, thus alerting store personnel to a possible theft or potential theft condition.

In some embodiments the signal transmitting retail devices can transmit a variety of tones, frequencies, wavelengths, decibel levels, etc. Additionally, a variety of ways to indicate the difference between a normal condition and a theft condition or potential theft condition are envisioned. Additionally, it is envisioned that in some embodiments the signal transmitting retail devices may transmit prerecorded speech messages or signals imitating human speech. Various methods of receiving and processing the various tones, frequencies, wavelengths, frequencies of occurrence, and pitches by the receiver unit 10 are envisioned.

Figure 2:
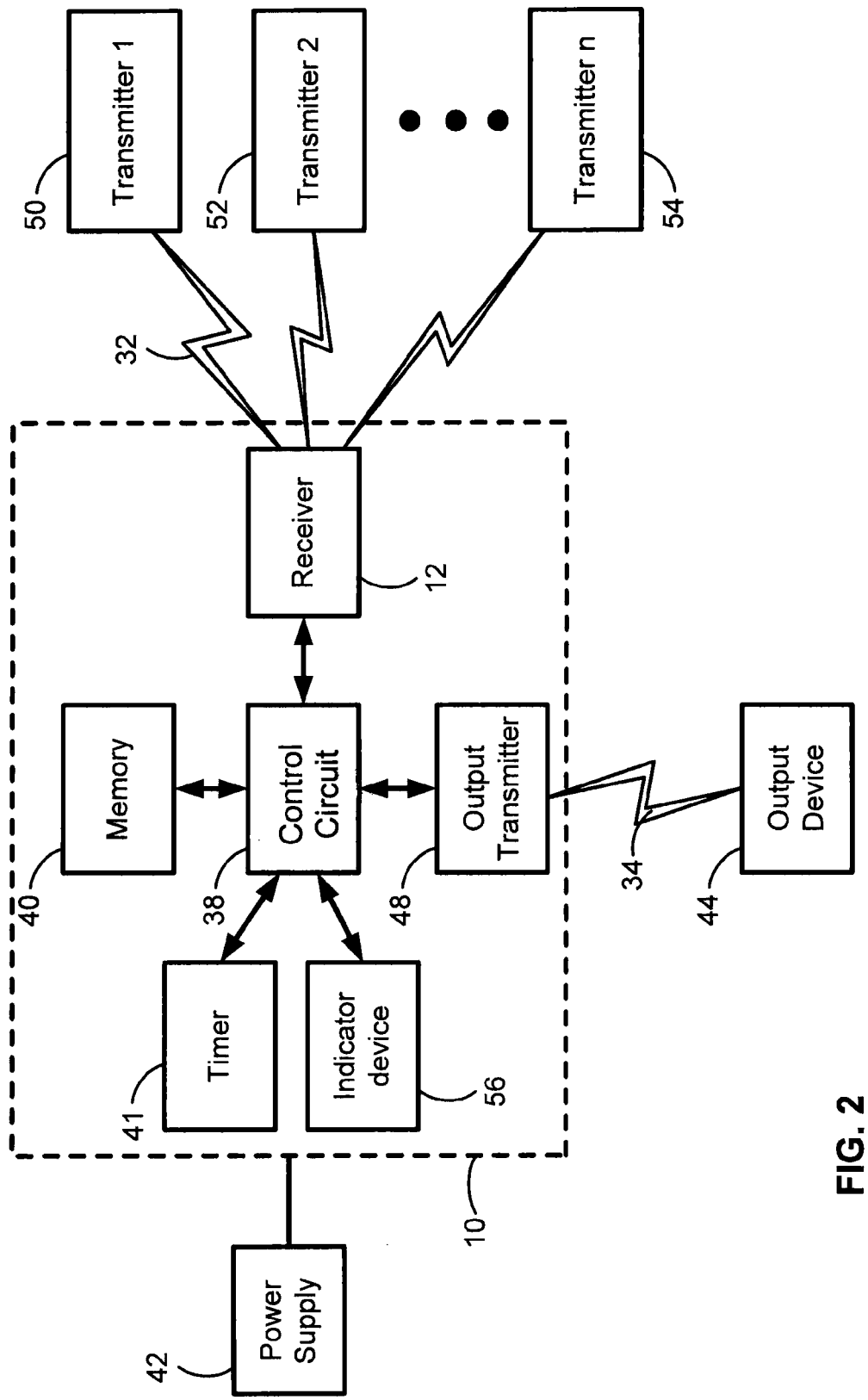
FIG. 2 is a schematic representation of the retail system signal receiver unit of FIG. 1.

Turning now to FIG. 2, a functional schematic of an embodiment of the retail system signal receiver unit 10 is illustrated. FIG. 2 shows a first arrangement of the receiver unit 10 relative to other components of an embodiment of a retail anti-theft alarm system, including a first, a second, and an nth signal transmitting retail device 50, 52, 54, an output receiving device 44, and a power supply 42. It will be understood that the retail system signal receiver unit 10 can be used in many different anti-theft system arrangements, and the components shown in FIG. 2 are for illustrative purposes only.

With further reference to FIG. 2, the internal components of an embodiment of a receiver unit 10 are discussed. The receiver unit 10 includes a receiver 12, arranged and configured to receive signals 32 from the transmitters 50, 52, and 54

(Transmitter n indicating that any potential number of transmitters is envisioned). The receiver 12 is in operative communication with a control circuit 38. The control circuit 38 may be a processor, non-programmable or programmable control circuit, integrated circuit, hardwired control circuit, microprocessor of any suitable type, or any suitable type of control circuit. The control circuit 38 is in operative communication with a memory storage unit 40, a local indicating device 56, and an output transmitter 48. In one embodiment the control circuit 38 is also in operative communication with a timer unit 41. A power supply 42 provides power to the receiver unit 10. Although the power supply 42 is shown external to the receiver unit 10 in FIG. 2, it will be understood that the power supply 42 may be any suitable type of power supply and that power can be supplied to the unit 10 in any suitable way, including an internally connected battery pack. Additionally, one power supply 42 may also supply power to one or more receiver units 10. In a one embodiment, the power supply 42 of the receiver unit 10 is an internally connected battery pack, and the output transmitter 48 is wireless transmitter such as an antenna.

In one embodiment, the receiver unit 10 is wireless, and may be installed in many convenient locations in a retail environment without requiring significant installation time or shelving space down time. The output receiving device 44 is shown in FIG. 1 as a computer 36, but any suitable output receiving device 44 may be used, including a cellular phone, pager, camera, public address (PA) system, etc.

Figure 3:
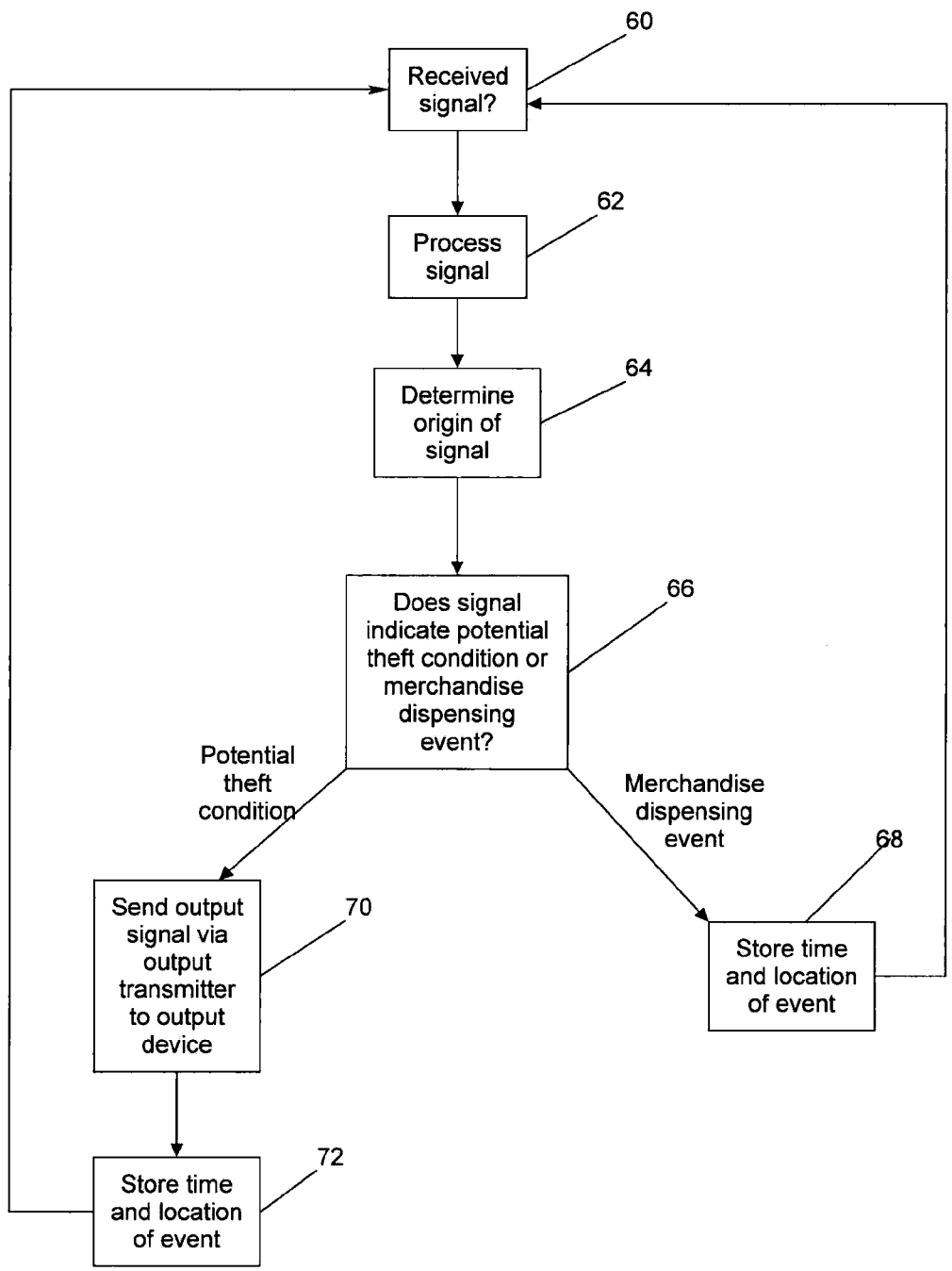
FIG. 3 is a block diagram illustrating the retail system signal receiver unit of FIGS. 1 and 2.

In one embodiment a system is set up in a retail environment. With reference to FIG. 3, in operation various signal emitting retail devices, cooperatively arranged throughout the store with retail display devices, emit signals. The receiver of a signal receiver unit waits to receive a signal 60. The control circuit of the signal receiver unit then recognizes the reception of a signal and begins processing the signal 62. The control circuit determines the origin of the signal 64, i.e., the retail display device and signal emitting retail device from which the signal was sent. The control circuit also determines whether the signal indicates a merchandise dispensing event, e.g., a person removing an item of merchandise from a shelf or cabinet of a retail display device, opening the door of a retail display device, removing a piece of merchandise from a hook, etc., or whether the signal indicates a potential theft condition, e.g., the door of a retail display device being left open for a period of time more than a preset period of time, the door being opened more than a preset number of times within a preset period of time, more than a preset number of pieces of merchandise being removed from a retail display device during a preset period of time, etc. 66. If the signal is determined to indicate a merchandise dispensing event, the control circuit stores, e.g., in local or remote memory, the time that the retail dispensing event took place and the location, i.e., the retail display device, at which the retail dispensing event took place 68. If the signal is determined to indicate a potential theft condition, the control circuit sends an output signal indicative of a potential theft condition via the output transmitter to an output device 70, with the output signal including information regarding the location, i.e., the retail display device, at which the potential theft condition took place. For example, in one embodiment an output device is a camera, and the output signal triggers the camera to record an image or video of the location of the potential theft condition. The control circuit then causes to be stored, e.g., in local or remote memory, the time and location at which the potential theft condition took place 72.

In one embodiment, at any time, or at regular time intervals, the receiver unit 10 can be queried to output a report of stored merchandise dispensing events and/or potential theft. The reports may be configured to be received and read by an external software program on an external hardware device. Such reports may be correlated with the merchandise that is displayed at various retail display devices to determine, e.g., selling rates at different times, times of potential theft conditions, and various other useful information. Additionally, for example, times included in the reports may be crosschecked against video data recorded by other retail security systems to help identify those who triggered potential theft conditions.

Figure 4:
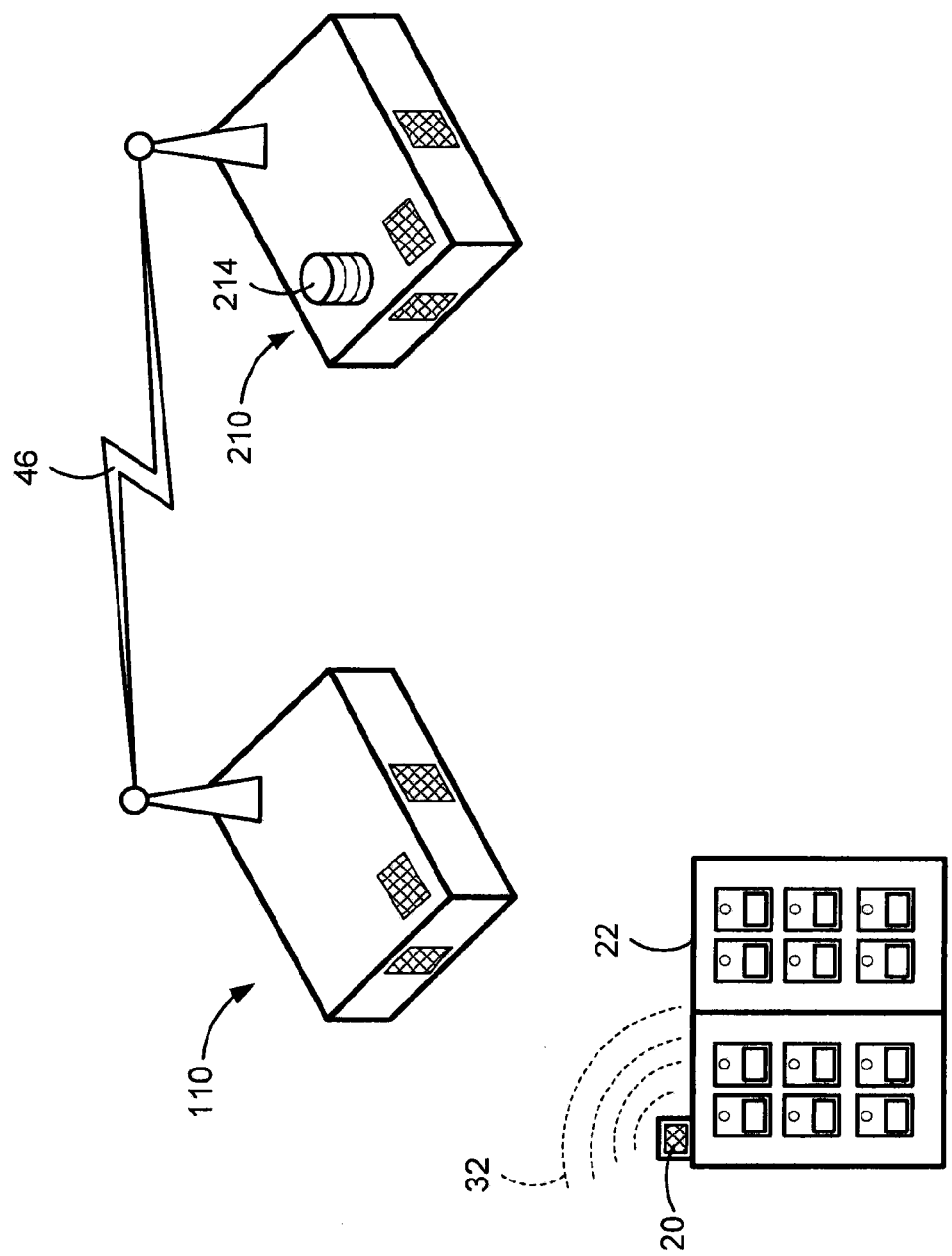
FIG. 4 is perspective view of the retail system signal receiver unit of FIG. 1 arranged as part of a multi-receiver audible anti-theft alarm system.

Turning now to FIG. 4, one embodiment of a first receiver unit 110 is shown relaying the signal 32 to a second receiver unit 210 via a relaying signal 46. Upon receipt of the signal from the first receiver unit 110, the second receiver unit 210 may activate its local indicator device 214, allowing store employees close to the second receiver unit 210 to be notified of a possible theft in an area close to the first receiver unit 110. This setup is exemplary, and it is envisioned that in some embodiments any number of receiver units may relay signals in the manner described above to, for example, notify employees throughout the store of a potential theft condition. Additionally, it is also envisioned that the signals passed between receiver units may include information allowing the receiver unit to display or in any manner known in the art communicate to store employees the location of a potential theft condition.

Having described the attributes of several embodiments of the instant invention, an exemplary method for the use of the signal receiving unit 10, in this embodiment an audible alarm signal receiving unit, is discussed. With reference to FIGS. 1-4 generally, the receiver 12 receives ambient noise from the surrounding area. The processor 38 monitors the ambient noise received by the receiver 12, and is configured to recognize one or more signals 32, in this embodiment preset audible alarm signals within the ambient noise. When the recognized preset audible alarm signals 32 reach or exceed a preset pitch, frequency of occurrence (i.e., number of times signal is emitted within a short preset time period), frequency, wavelength, or decibel level, the processor 38 is configured to signal the output transmitter 48 to generate an output signal 34. The output receiving device 44 receives the output signal 34.

In another exemplary method, the processor 38 also activates the local indicator device 56 upon recognition of a preset pitch, frequency of occurrence, frequency, wavelength, or decibel level of an audible alarm signal 32. The processor 38 is also configured to store information, determined by the processor based on the recognized audible alarm signal 32, in the memory storage unit 40. The processor 38 periodically accesses the memory storage unit 40 and compiles a report of collected data over a certain period of time. The generated report is then transmitted through the output transmitter 16 or other suitable means to an output device 36.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An audible anti-theft alarm receiver unit for retail anti-theft systems, comprising:
   a receiver configured to receive the ambient noise of a retail environment;
   a processor, coupled with the receiver wherein the processor is configured to recognize a preset audible alarm tone and generate an output signal upon the occurrence of a preset condition of the preset audible alarm;
   an output transmitter electrically connected to the processor for transmitting the output signal to an output device; and
   wherein the output device is a second audible anti-theft receiver unit, and the output signal is adapted to be received by the second audible anti-theft receiver unit for the purpose of activating a local indicating device proximate the second audible anti-theft receiver unit.

2. A theft deterrent system comprising:
   a sensor operatively associated with an emitter, the sensor configured to sense a potential theft condition at a retail display unit and the emitter configured to emit an alarm signal when a potential theft condition is sensed by the sensor;
   a signal receiver unit including a receiver in operative communication with a control circuit, and an output transmitter in operative communication with the control circuit, the receiver unit configured to receive an alarm signal, the control circuit configured to recognize an alarm signal received by the receiver and to output a signal indicating that the emitter has emitted an alarm signal indicating that a potential theft condition has occurred at the retail display unit via the output transmitter to an output device;
   further comprising a plurality of emitters each operatively associated with one of a plurality of sensors, each sensor configured to monitor a retail display device each of the emitters configured to emit an alarm signal having a unique identifier; and
   wherein the control circuit is configured to identify the source of alarm signals received by the receiver.

3. The theft deterrent system of claim 2, wherein the emitters are configured to emit alarm signals comprising audible sound waves, and wherein the control circuit is configured to identify the one of the emitters that emitted each alarm signal by at least one of the volume, frequency, pitch, and wavelength of the audible sound waves.

4. The theft deterrent system of claim 2, wherein an alarm signal emitted by the emitter travels wirelessly to the receiver and wherein an alarm signal emitted by the emitter comprises at least one of audible sound waves, infrared light, visible light, radio waves, and microwaves.

5. The theft deterrent system of claim 2, wherein the sensors are configured to sense at least one of when a retail display device has been actuated to allow removal of merchandise from the retail display device and when merchandise has been removed from the retail display device;
   wherein each of the emitters are configured to emit a removal signal when its associated sensor senses at least one of when its associated retail display device has been actuated to allow removal of merchandise from the retail display device and when merchandise has been removed from its associated retail display device;
   wherein the receiver is configured to receive removal signals; and
   wherein the control circuit is configured to recognize removal signals and produce an output indicative of a received removal signal upon recognition of the removal signal.

6. The theft deterrent system of claim 5, wherein the signal receiver unit further comprises a memory, and wherein, upon recognition of alarm and removal signals by the control circuit, at least one of the type of signal received, the time of reception, and the emitter from which the signal was received is stored in the memory; and
   wherein the signal receiving unit is configured to selectively output the contents of the memory.

* * * * *